United States Patent [19]

Weman et al.

[11] 3,999,722
[45] Dec. 28, 1976

[54] SAFETY BELT RETRACTOR WITH DUAL SENSITIVE, COMMONLY MOUNTED, ACTUATING MECHANISM

[75] Inventors: Per Olaf Weman, Haslah; Harald Martin Schmelow, Ellereu, Krs. Segeberg, both of Germany

[73] Assignee: Sigmatex, A.G., Switzerland

[22] Filed: Jan. 17, 1974

[21] Appl. No.: 434,318

[52] U.S. Cl. .................. 242/107.4 A; 242/107.4 B
[51] Int. Cl.$^2$ .................. A62B 35/00; B65H 75/48
[58] Field of Search .................. 242/107 R, 107.4; 297/388; 280/744–747

[56] References Cited
UNITED STATES PATENTS

| | | | |
|---|---|---|---|
| 3,180,456 | 4/1965 | Whittingham | 242/107.4 X |
| 3,521,832 | 7/1970 | Rex | 242/107.4 |
| 3,552,676 | 1/1971 | Weber | 242/107.4 |
| 3,741,496 | 6/1973 | Beller | 242/107.4 |
| 3,754,722 | 8/1973 | Nohren | 242/107.4 |
| 3,802,642 | 4/1974 | Klink | 242/107.4 |
| 3,819,126 | 6/1974 | Stoffel | 242/107.4 |
| 3,858,824 | 1/1975 | Stephenson | 242/107.4 A |

Primary Examiner—Stanley N. Gilreath
Assistant Examiner—John M. Jillions
Attorney, Agent, or Firm—John P. Kirby, Jr.

[57] ABSTRACT

The safety belt retractor of this invention has a belt-sensitive mechanism and a vehicle-sensitive mechanism, both mounted on an actuating mechanism. The actuating mechanism includes a mounting plate slidably mounted on the reel shaft for limited rotation and a flywheel having ratchet teeth. The vehicle-sensitive mechanism includes a pendulum assembly and an actuating pawl. When the pendulum assembly oscillates, it lifts the actuating pawl which engages the ratchet flywheel, causing the mounting plate to rotate and actuate a locking pawl. The belt-sensitive mechanism includes a pinion gear and a spur gear which is driven by the reel shaft. When withdrawal of the safety belt exceeds a predetermined level of acceleration, the flywheel lags in rotation and causes the pinion gear to move along an arc of the spur gear, causing the mounting plate to rotate and actuate the locking pawl. Rotation of the ratchet flywheel may be synchronized with rotation of a ratchet locking wheel to facilitate immediate engagement of the locking pawl with the ratchet locking wheel.

10 Claims, 8 Drawing Figures

SAFETY BELT RETRACTOR WITH DUAL SENSITIVE, COMMONLY MOUNTED, ACTUATING MECHANISM

BACKGROUND OF THE INVENTION

This invention relates to a retractor adapted for use with a safety belt in a vehicle or craft. Such a retractor may be mounted on the floor or on the frame of a vehicle or craft for use by occupants of the vehicle or craft including the driver and passengers. Such vehicles or crafts include automobiles, trucks, buses, railroad trains, aircraft and marine craft. The safety belt retractor is normally unlocked when the safety belt is being withdrawn and buckled about the user and is automatically locked in response to forces which develop during dangerous or emergency conditions, such as a collision. More particularly, this invention relates to a retractor having an actuating mechanism for emergency-locking which is dual sensitive, that is, responsive to two different types of forces: (1) forces applied to the vehicle and to the retractor within the vehicle; and (2) forces applied to the safety belt. Thus, the safety belt retractor of this invention is both vehicle-sensitive and belt-sensitive. The retractor is vehicle-sensitive because it will automatically lock in response to forces applied to the vehicle, and to the retractor because it is located within the vehicle, such as when the vehicle is tilted or overturned. The retractor is belt-sensitive because it will automatically lock in response to acceleration in withdrawal, that is, unwinding, of the safety belt from the retractor, such as when the user lurches forward against the seat belt at the moment of impact during collision. Still more particularly, this invention relates to a retractor having an improved and simplified design in which the vehicle-sensitive portion of the actuating mechanism and the belt-sensitive portion of the actuating mechanism are commonly mounted on a single plate.

Prior art seat belt retractors usually have a reel, biased in the rewind direction, to which a safety belt is attached for retraction. The reel is normally unlocked during ordinary driving conditions, even though the belt is buckled about the user. Thus, the belt may be withdrawn or retracted according to the normal movements of the user. One or more locking devices are provided to prevent further withdrawal of the belt and restrain the user in his seat in response to forces that develop during dangerous conditions. The state of the art in emergencylocking, vehicle safety seat belt retractors is exemplified by: U.S. Pat. No. 3,918,658 of Herbert R. Beller, entitled "Seat Belt Retractor having Inertial Device Activated by Two Stimuli" filed on June 15, 1973; U.S. Pat. No. 3,858,824 of R. L. Stephenson, entitled "Dual Action Safety Seat Belt Retractor" filed Mar. 27, 1973; and U.S. Pat. Nos. 3,180,456; 3,122,339; and 3,122,338 to Whittingham; and 3,489,367 to Kovacs.

SUMMARY OF THE INVENTION

The safety belt retractor of this invention is adapted for use with a safety seat belt in a vehicle. The retractor is adapted to prevent further withdrawal of the safety belt by a locking action on the safety belt in event of a dangerous situation. The safety belt is adapted to be locked in the restraining position in reference to the user to restrain movement of the user in event of a dangerous situation.

The retractor of this invention includes: a support assembly; a reel assembly; a locking mechanism mounted on the support assembly; a belt-sensitive mechanism; a vehicle-sensitive mechanism; and a dual sensitive actuating mechanism. The actuating mechanism is dual sensitive because it is responsive to two different types of forces: (1) forces applied to the vehicle and to the retractor because the retractor is located within the vehicle; and (2) forces applied to the safety belt. The reel assembly is mounted on the support assembly and is thereby supported by the support assembly. The safety belt is wound and unwound by the reel assembly. The reel assembly has a winding direction of rotation for retraction of the safety belt and an unwinding direction of rotation for withdrawal of the safety belt from the reel assembly.

The locking mechanism is mounted on the support assembly, and is thereby supported by the support assembly. The locking mechanism has an unlocked position to allow rotation of the reel assembly in the unwinding direction. The locking mechanism also has a locked position to engage the reel assembly and prevent further rotation of the reel assembly in the unwinding direction, which thereby prevents further withdrawal of the safety belt in event of a dangerous situation. The belt-sensitive mechanism is adapted to actuate the locking mechanism in response to a predetermined acceleration of movement of the safety belt in the withdrawal direction as the safety belt is unwound from the retractor. The vehicle-sensitive mechanism is adapted to actuate the locking mechanism in response to a predetermined change in acceleration, deceleration or orientation of the vehicle. The dual sensitive actuating mechanism includes a movable mounting plate which is adapted for limited rotation to actuate the locking mechanism. The belt-sensitive mechanism and the vehicle-sensitive mechanism are both mounted in common on the mounting plate and are movable with the mounting plate. The movable mounting plate is adapted to respond to either the belt-sensitive mechanism or the vehicle-sensitive mechanism. The mounting plate is adapted to actuate the locking mechanism into the locked position to prevent further rotation of the reel assembly in the unwinding direction and thereby stop further withdrawal of the safety belt in event of a dangerous situation.

Among the improvements and advantages of the retractor of this invention is the particular design of the actuating mechanism including the use of a mounting plate adapted for limited rotation and the arrangement of the belt-sensitive mechanism and the vehicle-sensitive mechanism mounted on the mounting plate and movable with the mounting plate. This arrangement provides simplicity of design and reduction in the number of parts. This arrangement also allows synchronization between the belt-sensitive mechanism, the vehicle-sensitive mechanism, the actuating mechanism and the locking mechanism. Such synchronization facilitates instant locking of the retractor during emergency conditions.

DETAILED DESCRIPTION

Figure 1:
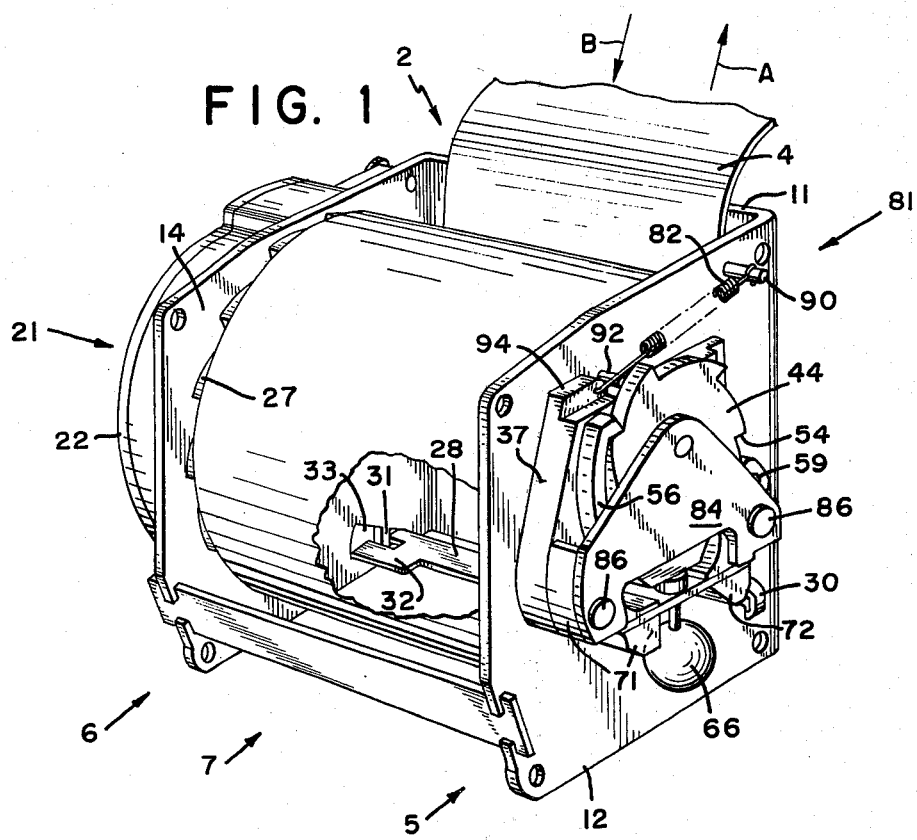
FIG. 1 is an isometric elevational view of the retractor of this invention and has a portion cut away to show the interior, including the locking pawl which is part of the locking mechanism.

Referring to FIG. 1, the safety belt retractor of this invention is referred to generally by the numeral 2 and is adapted for use with a safety seat belt in a vehicle. The safety belt 4 may be a lap belt, a shoulder belt or a combination or both. The safety belt 4 is wound within the retractor 2 and has a restraining position, a withdrawal direction and a retracting direction. The restraining position of the safety belt 4 is when the safety belt 4 has been buckled around the user. The withdrawal direction of the safety belt 4, indicated by arrow A, is when the safety belt 4 is being withdrawn, that is, unwound, from the retractor 2. The retracting direction of the safety belt 4, indicated by arrow B, is when the safety belt 4 is being wound or rewound within the retractor 2. The retractor 2 is adapted to prevent further withdrawal of the safety belt 4 in event of a dangerous situation by exerting a locking action on the safety belt 4. As a result of this locking action, the safety belt 4 is adapted to be locked in the restraining position in reference to the user, either a passenger or driver of the vehicle, to restrain movement of the user in event of a dangerous situation.

Figure 2:
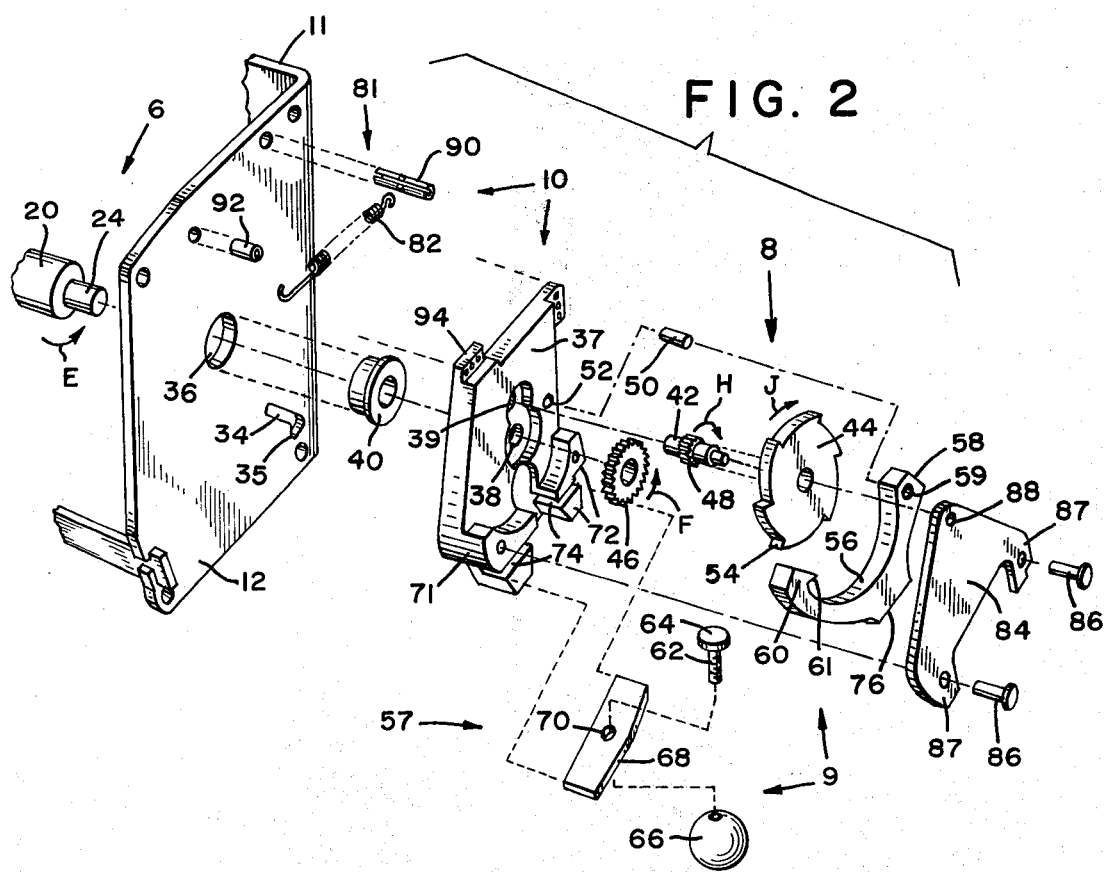
FIG. 2 is an exploded view of a part of FIG. 1, showing the components located on the right side of FIG. 1.
Figure 3:
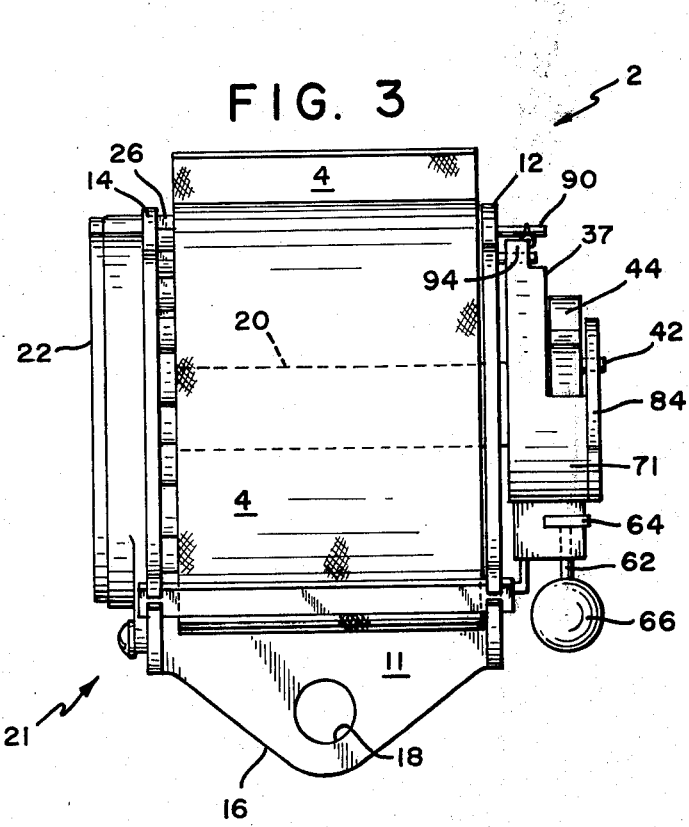
FIG. 3 is a front view of FIG. 1.

Referring to FIGS. 1 and 2, the retractor 2 of this invention includes: a support assembly, referred to generally by the numeral 5; a reel assembly, referred to generally by the numeral 6; a locking mechanism, referred to generally by the numeral 7; a belt-sensitive mechanism, referred to generally by the numeral 8; a vehicle-sensitive mechanism, referred to generally by the numeral 9; and a dual sensitive actuating mechanism, referred to generally by the numeral 10. Referring to FIG. 1, the support assembly 5 comprises a base 11 and two side walls 12 and 14. The side walls 12 and 14 are approximately parallel to one another and each side wall 12 and 14 is approximately perpendicular to the base 11. As a result, the support assembly 5 has a substantially U-shape. Referring to FIG. 3, the base 11 has a means for attaching the base 11 to the vehicle. In this embodiment, the means is a triangular-shaped tongue extension 16 of the base 11 having a hole 18 therein. In other embodiments, the hole may be positioned at a different location in the base 11, such as in the middle of the base 11. In still other embodiments, the retractor 2 may be affixed to the vehicle by means of brackets (not shown).

Referring to FIGS. 1, 2 and 3, the reel assembly 6 comprises a first shaft 20 (FIGS. 2 and 3) and a reel biasing means 21. The first shaft 20 is the reel shaft 20 and is disposed between the side walls 12 and 14 of the support assembly 5. The reel shaft 20 extends through and is journaled on the side walls 12 and 14. The safety belt 4 is wound and unwound on the reel shaft 20. The reel biasing means 21 uses a helical spring (not shown) connected to the reel shaft 20 to bias the reel shaft 20 in the winding direction of rotation, which moves the safety belt in the retracting direction B. The helical spring is a conventional mechanism used in the safety belt retractor art to bias the reel assembly 6 in the winding direction of rotation of the reel assembly 6 to wind the safety belt 4 on the reel assembly. Such a helical spring is disclosed in U.S. Pat. Nos. 3,695,546 to T. Takada; 3,482,799 to Wrighton et al.; and 3,446,454 to Kovacs et al. The reel biasing means 21 also includes a cover 22 within which the helical spring is positioned. Both the cover 22 and helical spring are positioned on the outside of the support assembly 5 and mounted on side wall 14.

Figure 7:
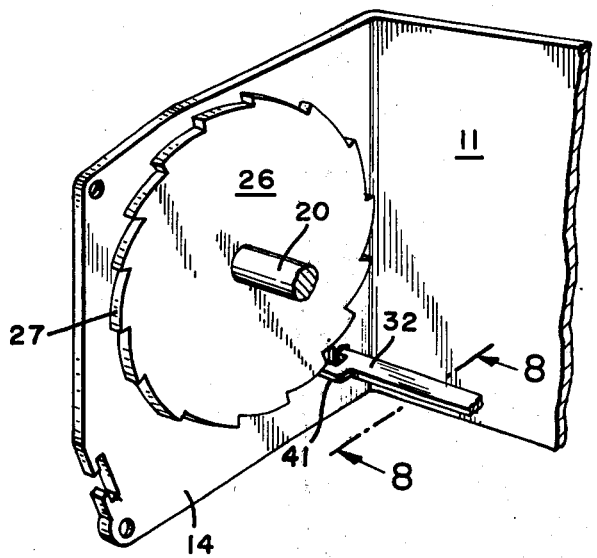
FIG. 7 is a cut-away view of FIG. 1, showing a portion of the interior of the retractor, including the locking wheel and the locking pawl.

Referring to FIGS. 1, 3, 7 and 8, the locking mechanism 7 includes a first wheel 26 (FIGS. 3 and 7) and a locking pawl 28 (FIGS. 1 and 7). The first wheel 26 is a locking wheel 26 having ratchet teeth 27 (FIG. 1) disposed around the outer circumference of the locking wheel 26. The locking wheel 26 is mounted on the first shaft 20, which is the reel shaft 20, in the interior of the support assembly 5 adjacent to the interior side of side wall 14. In this embodiment, one locking wheel 26 is used. In other embodiments, two locking wheels may be used. The additional locking wheel may be disposed on the opposite side of the reel shaft 20, adjacent to the interior side of side wall 12. Referring to FIG. 1, the locking pawl 28 extends between the side walls 12 and 14 of the support assembly 5. The locking pawl 28 has an actuating end 30 and a locking end 32. The locking end 32 of the locking pawl 28 has a locking edge 41 (FIGS. 7 and 8) which is adapted to engage a ratchet tooth 27 of the locking wheel 26. The locking end 32 extends through an aperture 33 in side wall 14 of the support assembly 5. Referring to FIGS. 1 and 2, the actuating end 30 (FIG. 1) of the locking pawl 28 extends through an aperture 34 (FIG. 2) in the side wall 12 of the support assembly 5. Referring to FIG. 2, the aperture 34 in side wall 12 has the shape of a rectangular slot which is slanted in an approximately 45° angle with the vertical plane. The aperture 34 has an enlarged opening 35 at its bottom end.

Figure 8:
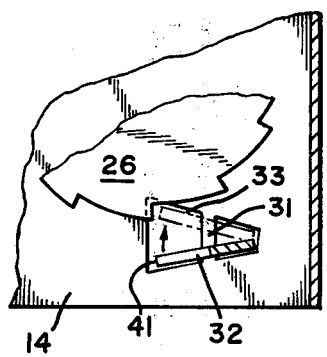
FIG. 8 is a cross-section of FIG. 7 along the lines 8—8.

Referring to FIGS. 1, 7 and 8, the locking pawl 28 has a locked position and an unlocked position. The locking pawl 28 is pivotably mounted between the side walls 12 and 14 of the support assembly 5 and is adapted for limited pivoting movement between its unlocked position and its locked position. The aperture 33 in side wall 14 is approximately triangular in shape. The lower leg of the triangle may be disposed at a slight incline with the horizontal plane of approximately 5° to 10°, the incline being downward in the direction toward the locking edge 41 of the locking pawl 28. The upper leg of the triangle is disposed at an approximately 10° to 30° angle to the horizontal plane. The unlocked position of locking pawl 28 is when locking pawl 28 is lying on the lower leg of the triangle of aperture 33. The locked position of locking pawl 28 is when the locking pawl 28 has been pivoted toward the upper leg of the triangular aperture 33. FIGS. 1, 7 and 8 show the locking pawl 28 in its unlocked position. Optionally, the locking end 32 of the locking pawl 28 may be bifurcated and the aperture 33 in side wall 14 may have an additional support piece 31. In its unlocked position, the locking pawl 28 allows rotation of the locking wheel 26 in the unwinding direction of rotation to allow withdrawal of the safety belt 4 from the reel assembly 6. In its locked position, the locking pawl engages a ratchet tooth 27 of the locking wheel 26 to stop rotation of the reel assembly 6 in the unwinding direction and thereby stop withdrawal of the safety belt 4. As a result, the locked position of the locking pawl 28 restrains movement of the user when the safety belt 4 is buckled about the user.

Referring to FIG. 2, the first shaft 20, which is the reel shaft 20, of the reel assembly 6 has a shaft section 24 at the end of reel shaft 20 which is adjacent to side wall 12. The shaft section 24 is of diminished diameter by comparison to the reel shaft 20. The end of reel shaft 20 and shaft section 24 extend through a hole 36 in the side wall 12.

Referring to FIG. 2, the actuating mechanism 10 includes a mounting plate 37, a second shaft 42 and a second wheel 44. The mounting plate 37 is a substantially flat plate having an irregular shape which approaches the shape of a square. The mounting plate 37 has a first aperture 38 and a second aperture 39. The first aperture 38 is positioned in the approximate center of the mounting plate 37. The second aperture 39 is offset from the first aperture 38 and is positioned above the first aperture 38. The mounting plate 37 is slidably and rotatably mounted on the end of reel shaft 20. Reel shaft 20 and mounting plate 37 rotate independently of each other. The shaft section 24 of the reel shaft 20 extends through the first aperture 38 of the mounting plate 37. A bushing 40 is disposed in hole 36 between the reel shaft 20 and the mounting plate 37, between the reel shaft 20 and the side wall 12 and between the side wall 12 and the mounting plate 37. The bushing 40 is adapted to fit around the end of the reel shaft 20 and the shaft section 24 extends through the bushing 40 and through the mounting plate 37. The second shaft 42 is rotatably mounted in the second aperture 39 of the mounting plate 37. The second wheel 44 is adapted to cooperate with both the belt-sensitive mechanism 8 and the vehicle-sensitive mechanism 9. The second wheel 44 is mounted on the second shaft 42 and is adapted to rotate with the second shaft 42 in the second aperture 39 of the mounting plate 37.

Referring to FIG. 2, the belt-sensitive mechanism 8 includes: a spur gear 46; and a pinion gear 48; both of which operate in cooperation with the second wheel 44. The spur gear 46 is mounted on the shaft section 24 of the reel shaft 20 on the exterior side of the mounting plate 37, that is, the opposite side of the mounting plate 37 from the side wall 12. The spur gear 46 is driven by the reel shaft 20 as the safety belt 4 is moved in the withdrawal direction A or the retracting direction B, indicated in FIG. 1. The pinion gear 48 is mounted on the second shaft 42. The pinion gear 48 is positioned between the mounting plate 37 and the second wheel 44 on the exterior side of the mounting plate 37. The pinion gear 48 is adapted to engage the spur gear 46 and is driven by the spur gear 46. The pinion gear 48 is also adapted to move with reference to the spur gear 46 along an arc of the spur gear 46 on the outer circumference of the spur gear 46. When the safety belt 4 is withdrawn or retracted, it causes the reel assembly 6 to turn which in turn causes the spur gear 46 and pinion gear 48 to turn.

Referring to FIG. 2, the second wheel 44 is an inertial flywheel 44. The flywheel 44 rotates with the pinion gear 48 on the second shaft 42. The flywheel 44 is adapted to resist acceleration of rotation above a predetermined magnitude corresponding to acceleration in the withdrawal direction A of the safety belt 4 (FIG. 1) above a predetermined magnitude. The resistance of the flywheel 44 to further acceleration of rotation above a predetermined magnitude is adapted to cause the pinion gear 48 to move with reference to the spur gear 46 along an arc of the spur gear 46. This movement of the pinion gear 48 along the arc of the spur gear 46 causes limited rotation of the mounting plate 37 with reference to reel shaft 20. This limited rotation of the mounting plate 37 actuates the locking pawl 28 of the locking mechanism 7 to its locked position.

In operation, when safety belt 4 is withdrawn from the retractor 2 in the direction indicated by arrow A in FIG. 1, it causes the reel shaft 20 to rotate in a counterclockwise direction, indicated by arrow E in FIG. 2. Counterclockwise rotation of reel shaft 20 causes spur gear 46 to rotate in a counterclockwise direction, indicated by arrow F in FIG. 2. Counterclockwise rotation of spur gear 46 causes pinion gear 48 to rotate in a clockwise direction, indicated by arrow H in FIG. 2. Clockwise rotation of pinion gear 48 causes the flywheel 44 to rotate in a clockwise direction indicated by arrow J in FIG. 2. When withdrawal of the safety belt 4 exceeds a predetermined magnitude of acceleration and flywheel 44 resists further acceleration because of inertia, pinion gear 48 is caused to move along an arc of spur gear 46 in a direction indicated by arrow F in FIG. 2. This causes mounting plate 37 to undergo limited rotation, such limited rotation being indicated by arrow C in FIG. 6.

Figure 4:
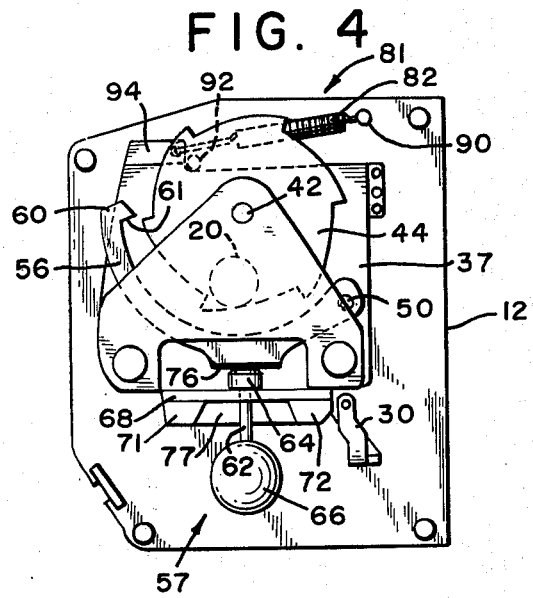
FIG. 4 is a side view of FIG. 1 showing the components on the right side of FIG. 1 in their unlocked position.
Figure 5:
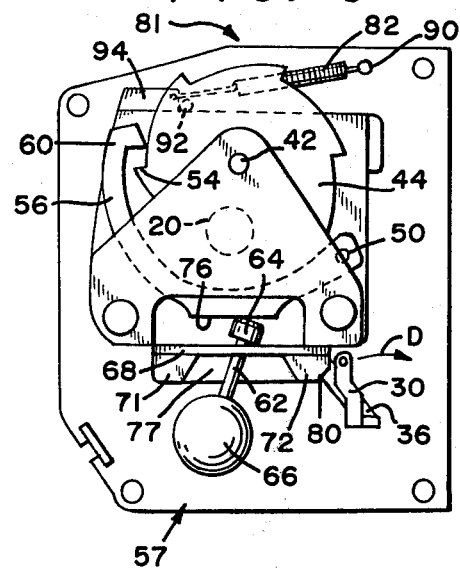
FIG. 5 is a side view of FIG. 1 showing the components on the right side of FIG. 1 as the vehicle-sensitive mechanism is being moved to its locked position.
Figure 6:
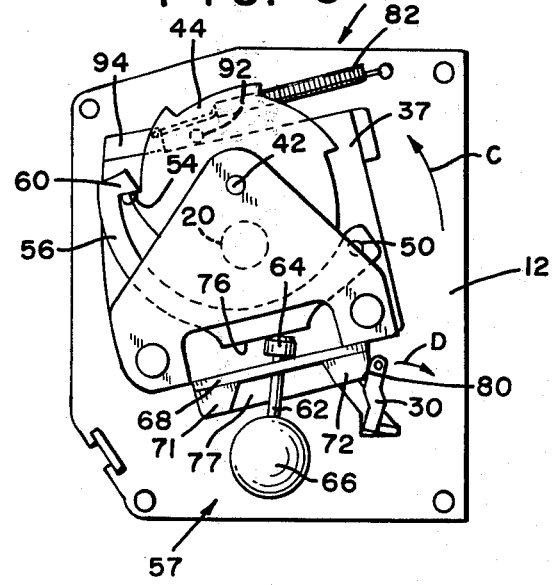
FIG. 6 is a side view of FIG. 1 showing the components on the right side of FIG. 1 after the vehicle-sensitive mechanism or the belt-sensitive mechanism or both have been moved to their locked position.

Referring to FIGS. 4, 5 and 6, the mounting plate 37 of the actuating mechanism 10 has an unlocked position and a locked position. The unlocked position of the mounting plate 37, illustrated in FIGS. 4 and 5, corresponds to the position of the pinion gear 48 and the flywheel 44 before the pinion gear moves with reference to spur gear 46 along an arc of the spur gear 46. In this embodiment in which the mounting plate 37 has the approximate shape of a square, the unlocked position of the mounting plate is indicated by the right side of the mounting plate being approximately vertical and parallel to the right vertical side of side wall 12. The locked position of the mounting plate 37, illustrated in FIG. 6, corresponds to the position of the pinion gear 48 and flywheel 44 when pinion gear 48 has moved along the arc of the spur gear 46. Pinion gear 48 and flywheel 44 move together because they are both mounted on the same second shaft 42, as shown in FIG. 2. Such movement of the pinion gear 48 along an arc of spur gear 46 causes limited rotation of the mounting plate 37 in the direction of arrow C in FIG. 6. In this embodiment, the locked position of the mounting plate 37 is indicated by the right side of mounting plate 37 being slanted with reference to the vertical right side of side wall 12. Other embodiments of the mounting plate 37 may have a shape other than that of an approximate square, with the result that the sides of the mounting plate would not provide the same indication of which position the mounting plate 37 is in.

Referring to FIGS. 1, 2, 4, 5 and 6, the actuating mechanism 10 also includes a biasing means 81 to bias the mounting plate 37 of the actuating mechanism 10 in its unlocked position. The biasing means 81 includes: a biasing spring 82, a spring post 90 and a stop member 92. The spring post 90 is mounted on the upper right corner of side wall 12 which is part of the support assembly 5. The biasing spring 82 has one end mounted on the spring post 90 and the other end mounted on the upper left corner of the mounting plate 37 of the actuating mechanism 10. The stop member 92 is mounted in the upper portion of the side wall 12, spaced apart from and to the left of the spring post 90. The upper left corner of the mounting plate 37 has an appendage 94 which abuts against the stop member 92 and thereby limits rotation of the mounting plate in a clockwise direction. The biasing spring 82 is attached to the mounting plate at appendage 94. Referring to FIGS. 4 and 5, the biasing spring 82 holds the mounting plate 37 of the actuating mechanism 10 in its unlocked position. Referring to FIG. 6, when withdrawal of the safety belt above a predetermined level of acceleration overcomes the force of biasing spring 82, the mounting plate 37 is moved to its locked position, which stretches the biasing spring 82.

When the mounting plate 37 is moved to its locked position illustrated in FIG. 6, the flywheel 44 is engaged by an actuating pawl 56 which is part of the vehicle-sensitive mechanism 9. Such engagement occurs because flywheel 44 also has ratchet teeth on its outer circumference, enabling flywheel 44 to function as a ratchet wheel in cooperation with actuating pawl 56. Referring to FIG. 4, the flywheel 44 is not engaged by actuating pawl 56 while the mounting plate 37 is in its unlocked position because flywheel 44 is not sufficiently close to actuating pawl 56. This engagement between flywheel 44 and actuating pawl 56 occurs even though actuating pawl 56 has not been lifted from its unlocked position shown in FIG. 4 to its locked position shown in FIGS. 5 and 6 by the oscillation of the pendulum assembly 57. The pendulum assembly 57 and the actuating pawl 56 are part of the vehicle-sensitive mechanism 9 and will be explained subsequently. The engagement between actuating pawl 56 in its unlocked position and flywheel 44 facilitates positive locking of the retractor 2 in response to the belt-sensitive mechanism 8, independently of the vehicle-sensitive mechanism 9.

Referring to FIG. 2, the vehicle-sensitive mechanism 9 includes a pawl pivot post 50; an actuating pawl 56; and a pendulum assembly 57; all of which operate in cooperation with the second wheel 44. The pawl pivot post 50 is mounted in a third aperture 52 on mounting plate 37. The third aperture 52 is offset from the first aperture 38 and the second aperture 39 in mounting plate 37. The third aperture 52 is positioned at a slightly lower level below the horizontal than the first aperture 38. The actuating pawl 56 is pivotably mounted on the pawl pivot post 50. The second wheel 44 is a ratchet wheel, as well as a flywheel, because it has ratchet teeth 54 adapted to be engaged by the actuating pawl 56. The actuating pawl 56 has a substantially arcuate shape and has a pivoting end 58, a pivot point 59 and an engaging end 60. The engaging end 60 is at the opposite end of the arc from the pivoting end 58. The arcuate shape of the actuating pawl 56 is adapted to conform substantially to the outer circumference of the second wheel 44. The locking surface 61 of the engaging end 60 of the actuating pawl 56 is adapted to move perpendicularly to a tangent of the second wheel 44 at the point of engagement on the second wheel 44. At the time of engagement, the locking surface 61 is parallel to the locking surface of the ratchet tooth 54 to be engaged. This facilitates positive locking and helps to prevent the actuating pawl 56 from skipping one or more ratchet teeth 54 or slipping out of engagement with the second wheel 44.

Referring to FIGS. 2, 3, 4, 5, and 6, the pendulum assembly 57 includes a pendulum rod 62; a pendulum head 64; a pendulum weight 66; a pendulum support 68. As best seen in FIG. 2, the pendulum rod 62 has an upper end and a lower end. The pendulum head 64 is disposed at the upper end of the pendulum rod 62. The pendulum support 68 is a substantially rectangular flat plate, which may be made either of plastic or of metal. The pendulum support 68 has a hole 70 therein, located in approximately the middle of the pendulum support 68 and adapted to receive the pendulum rod 62. The pendulum weight 66, pendulum rod 62, and pendulum head 64 are adapted for oscillating motion with reference to the pendulum support 68. The pendulum head 64 is positioned above the pendulum support 68 and the pendulum weight 66 is positioned below the pendulum support 68. The pendulum support 68 is mounted horizontally on mounting plate 37. Since the pendulum support 68 carries the other elements of the pendulum assembly, the entire pendulum assembly may be considered to be mounted on the mounting plate 37.

Referring to FIGS. 2 and 3, to facilitate such mounting of the pendulum support 68 on the mounting plate 37, the mounting plate 37 has two widened portions 71 and 72 at the bottom of mounting plate 37 which are approximately twice as wide as the other portions of the mounting plate 37. The widened portions 71 and 72 each have a horizontal slot 74 FIG. 2) therein adapted to receive the pendulum support 68. The slot 74 is positioned approximately horizontal in order to hold the pendulum support in a horizontal configuration. Referring to FIGS. 4, 5 and 6, there is a space 77 between the widened portions 71 and 72 of the mounting plate 37 adapted to receive the pendulum rod 62 and pendulum head 64 in order to allow the pendulum rod to oscillate.

Referring to FIGS. 4, 5 and 6, the pendulum assembly 57 is adapted to move the actuating pawl 56 into engagement with a ratchet tooth 54 of the second wheel 44. Referring to FIG. 6, the engagement of the locking surface 61 of the actuating pawl 56 with a ratchet tooth 54 of the second wheel 44 causes limited rotation of the mounting plate 37 with reference to the reel shaft 20 in the direction indicated by arrow C in FIG. 6. This limited rotation of the mounting plate 37 actuates the locking mechanism 7 of the retractor 2 to its locked position. The pendulum assembly 57 is adapted to respond to a change in speed, direction of movement or orientation of the retractor 2. The retractor 2 reflects a change in speed, direction of movement or orientation of the vehicle within which the retractor is mounted. Such a change includes a sudden acceleration of the vehicle, a sudden deceleration of the vehicle or a tilting of the vehicle which might occur if the vehicle were overturned.

The vehicle-sensitive mechanism 9 has an unlocked position illustrated in FIG. 4 and a locked position illustrated in FIGS. 5 and 6. Referring to FIG. 4, the unlocked position of the vehicle-sensitive mechanism 9 is when the pendulum weight 66, pendulum rod 62 and pendulum head 64 are in a substantially vertical configuration, that is, the pendulum weight 66 has not been caused to oscillate to either side. The actuating pawl 56 has a substantially flat actuating surface 76 on the bottom of the actuating pawl 56. The actuating surface 76 of the actuating pawl 56 rests upon the pendulum head 64. The actuating pawl 56 has an unlocked position and a locked position. The unlocked position of the actuating pawl 56 is illustrated in FIG. 4 wherein the actuating pawl 56 is in its lower position resting upon the pendulum head 64 and the engaging end 60 of the actuating pawl 56 is pivoted away from the second wheel 44.

The locked position of the actuating pawl 56 is illustrated in FIGS. 5 and 6. In its locked position, the actuating pawl 56 has been pivoted on its pivot post 50 as a result of oscillation of the pendulum weight 66, as shown in FIG. 5. The actuating pawl 56 has been pivoted so as to bring the locking end 60 of the actuating pawl 56 toward the second wheel 44, causing the locking end 60 of the actuating pawl 56 to engage a ratchet tooth 54 of the second wheel 44. The actuating pawl 56 is pivoted into its locked position by the pendulum assembly 57 which lifts the actuating pawl 56 slightly as a result of the movement of the pendulum head 64 against the actuating surface 76 of the actuating pawl. To facilitate sensitivity and enable the actuating pawl 56 to be lifted by the pendulum assembly 57, the actuating pawl 56 may be made of a comparatively light material, such as a plastic.

FIG. 6 illustrates the condition after the actuating pawl 56 has engaged a ratchet tooth 54 of the second wheel 44 and has caused the mounting plate 37 to rotate counterclockwise in the direction indicated by arrow C. Such rotation of the mounting plate 37, in response either to the belt-sensitive mechanism 8 or the vehicle-sensitive mechanism, actuates the locking pawl 28 (FIG. 1) of the locking mechanism 7 from its unlocked position to its locked position in the following manner. Referring to FIG. 6, the mounting plate 37 has an actuating surface 80 in the lower right corner of the mounting plate 37 on the exterior of one of the widened portions 72. When the mounting plate 37 is caused to rotate in the direction indicated by arrow C, the actuating surface 80 abuts the actuating end 30 of locking pawl 28, causing the actuating end 30 to pivot in the direction indicated by arrow D. The pivoting movement of actuating end 30 causes the locking pawl 28, shown in FIGS. 1 and 7, to pivot from its unlocked position to its locked position and engage locking wheel 26 shown in FIGS. 2 and 7. The limited rotation of the mounting plate 37 is in the direction indicated by arrow C is in the range of from approximately 1° to 20°. Likewise, the pivoting movement of the actuating end 30 of locking pawl 28 in the direction indicated by arrow D and the pivoting movement of actuating pawl 56 above pivot point 59 are also in the range of from approximately 1° to 20°. Referring to FIG. 1, the pivoting movement of locking pawl 28 from its unlocked position to its locked position is likewise in the range of from approximately 1° to 20°.

Referring to FIGS. 1 and 2, the actuating mechanism is also provided with a cover plate 84. The cover plate 84 is mounted on the outside of the retractor 2 and on the outside of the flywheel 44, actuating pawl 56 and mounting plate 37. The cover plate 84 is affixed to the mounting plate 37 by means of rivets 86. In this embodiment the cover plate has an approximately triangular shape with appendages 87 at the base of the triangle. One rivet 86 passes through a hole in each appendage 87. One rivet 86 passes into widened portion 71 of mounting plate 37 and the other rivet passes into widened portion 72 of mounting plate 37. The apex of the triangle of cover plate 84 has a hole 88 therein. The hole 88 is adapted to receive second shaft 42. Referring to FIGS. 4, 5 and 6, the reel shaft 20 positioned in approximately the middle of mounting plate 37. The pawl pivot post 50 is positioned on the right side of mounting plate 37 slightly below the level of the reel shaft 20. The second shaft 42 for the flywheel is positioned on the mounting plate 37 above the reel shaft 20, that is, closer to the upper side of the mounting plate 37.

For purposes of comparison and contrast, the retractor 2 has two pawls: an actuating pawl 56 (FIG. 2) and a locking pawl 28 (FIG. 1). The retractor 2 also has two ratchet wheels: a first wheel 26 (FIG. 2), which is the locking wheel 26, and a second wheel 44 (FIG. 2), which is a combination ratchet wheel and flywheel. Both the flywheel 44 and the locking wheel 26 have ratchet teeth on their outer circumferences. The flywheel 44 is rotatably mounted on the mounting plate 37 on the outside of the support assembly 5 and is a part of the actuating mechanism 10. The locking wheel 26 (FIG. 3) is mounted on the reel shaft 20 in the interior of the support assembly 5 and responds to either the vehicle-sensitive mechanism 9 or the belt-sensitive mechanism 8. The actuator pawl 56 (FIG. 2) is a part of the vehicle-sensitive mechanism 9 and is associated with the second wheel 44, that is, the ratchet flywheel 44. The locking pawl 28 (FIG. 1) cooperates with the first wheel 26 (FIG. 3), that is, the locking ratchet wheel 26 which is mounted on the reel shaft 20. The locking pawl 28 (FIG. 1) responds to either the vehicle-sensitive mechanism 9 or the belt-sensitive mechanism 8. The actuator pawl 56 is mounted on the mounting plate 37 on the outside of the support assembly 5. The locking pawl 28 is mounted adjacent to the first wheel 26, the locking ratchet wheel 26, in the inside of the support assembly 5.

Thus, the actuating mechanism 10 (FIG. 2) is responsive to either one of two different but related stimuli, one stimulus from belt-sensitive mechanism 8 and the other stimulus from vehicle-sensitive mechanism 9 (FIG. 2). Under emergency conditions, such stimuli urge the locking pawl 28 (FIG. 1) into engagement with the locking ratchet wheel 26. This dual response is particularly important because the forces or conditions which develop at the time of an accident vary in nature. Having an actuating mechanism which is responsive to two different stimuli increases the range of sensitivity of the retractor 2. For example, a car can veer off the highway, go over an embankment and roll over, without the usual accelerated withdrawal of the safety belt 4 characteristic of a collision. Activation of the retractor 2 in such a situation can reduce the danger of injury or loss of life. The vehicle-sensitive mechanism 9 of the retractor 2 will respond to such tilting or roll-over of the vehicle in which the retractor 2 is installed. Such response is provided by a pendulum having freedom to swing in any direction. The belt-sensitive mechanism 8 is responsive to acceleration or deceleration of the vehicle. Deceleration, of course, results from braking or collision. Acceleration of a degree to constitute an emergency will result from the vehicle being struck from the rear or sides. It also will occur when the vehicle is struck in front when stationary, or when a collision with another moving vehicle is sufficiently severe as to reverse or change direction of the vehicle.

Referring to the vehicle-sensitive mechanism 9 shown in FIG. 2, the free swinging pendulum assembly 57 does not have a direct effect on the locking pawl 28. Rather, the vehicle-sensitive mechanism 9 places the actuating pawl 56 in a condition with reference to the second wheel 44 in which any pull on the safety belt 4 causes the actuating pawl 56 to instantly engage a ratchet tooth 54 of the second wheel 44. Thus, it is not the relatively weak force of the pendulum assembly 57 that activates the locking pawl 28 (FIG. 1), but the far greater force applied to the safety belt 4 by the body-movement of the wearer. It is important to note that motion of the belt to cause the locking pawl 28 (FIG. 1) to engage the locking wheel 28 (FIG. 3) when the pendulum assembly 57 (FIG. 2) has responded to acceleration, deceleration or tilt of the vehicle, need not be an accelerating motion. Any motion of the safety belt 4 in the withdrawal (arrow A in FIG. 1) direction however uniform or slight, serves to lock the retractor 2 against further withdrawal of the safety belt 4, provided that the pendulum assembly 57 (FIG. 2) has first responded to stimulus. Since the pendulum assembly 57 (FIG. 2) can be made as sensitive or insensitive as desired, this novel arrangement provides a very positive and reliable restraint. The actuating pawl 56 (FIG. 2) can be made of a light material for enhanced sensitivity because the actuating pawl 56 and the second wheel 44 do not bear the force transmitted by the safety belt 4 upon locking. This force resulting from locking of the belt is borne by the heavy duty locking pawl 28 and locking wheel 26.

To differentiate between desirable locking due to vehicle roll over and undesirable locking on a steep hill, it is only necessary to adjust the space 77 between widened portions 71 and 72 for the pendulum assembly 57 so that response occurs only when the angle assumed by the pendulum rod 62 is greater than would be encountered on an inclined road. If it is desired to eliminate response of the vehicle-sensitive mechanism 9 to roll over, and restrict it to forces generated by a collision, it is only necessary to lighten the pendulum weight 66 to a point where normal tilting is insufficient to activate the locking pawl 28, but the larger forces developed as a result of a collision are easily sufficient.

The response of the inertial belt-sensitive mechanism 8 or seat belt retractor 2 to withdrawal of the safety belt 4 above a pre-selected rate of acceleration, as would be caused by the sudden forward lurch of a person wearing the belt in a vehicle involved in a collision, constitutes response to the second stimulus. Such response is provided by an inertial flywheel 44 (FIG. 2) which is a component of the actuating mechanism 10 (FIG. 2). The inertia of the flywheel 44 to sudden rotation, when driven by its geared connection to the reel shaft 20 on which the safety belt 4 is wound, develops the alternate force which urges the locking pawl 28 (FIG. 1) into locking engagement with the locking wheel 26 (FIG. 3). This force develops, because the flywheel 44 is attached to the same second shaft 42 as the pinion gear 48 which rotates the mounting plate 37 about the reel shaft 20 on which the safety belt 4 is wound. The mounting plate 37 response to both the belt-sensitive mechanism 8 and the vehicle-sensitive mechanism 9 to actuate the locking pawl 28. The mounting plate 37 is disposed for limited rotation in a plane adjacent and parallel to side wall 12. The mounting plate 37 is spring-biased by spring 82 to its unlocked position. The pinion gear 48 engages a driving spur gear 46 fixed to the reel shaft 20, so that substantially uniform withdrawal of the safety belt, such as occurs when the safety belt 4 is withdrawn from the retractor 2 for buckling about a passenger, merely turns the flywheel 44 without having any effect on the locking mechanism 7. On the other hand, if the safety belt 4 is suddenly and forcefully withdrawn beyond a preselected rate of acceleration, the resistance offered by the flywheel 44 to sudden accelerating rotation, causes the pinion gear 48 to "climb up" or rotate about the spur gear 46 and in so doing to carry with it the mounting plate 37 to which it is attached. This occurs at a rate of acceleration such that the resistance to rotation of the flywheel 44 exceeds the force of the spring 82 holding the mounting plate 37 in its normally stationary position. The rotation of the mounting plate 37 about the reel shaft 20 and spur gear 46 urges the locking pawl 28 into engagement with the locking wheel 26, thus preventing further withdrawal of the safety belt 4.

Among the advantages of the retractor 2 of this invention is the reduction of moving parts and the simplicity of design, as compared to prior art dual sensitive retractors. For example, the retractor 2 eliminates the need for a clutch plate used in prior art belt-sensitive retractors. Another advantage of the retractor 2 is that the rotation of ratchet teeth 54 on the second wheel 44 may be synchronized with the rotation of ratchet teeth 27 on first wheel 26. The result of this synchronization is that when actuating pawl 56 is engaged by a ratchet tooth 54 of flywheel 44, locking pawl 28 is caused to engage locking wheel 26 at the precise point where the next ratchet tooth 27 is located, rather than having locking pawl 28 fall between adjacent ratchet teeth 27, which would delay locking of the retractor 2 and perhaps cause the locking pawl 28 to skip one or more ratchet teeth 27. The significance of this synchronization is that it facilitates instant locking of the retractor 2 under emergency conditions to protect the user from injury.

We claim:
1. A retractor for use with a safety belt in a vehicle to prevent further withdrawal of said safety belt by a locking action on said safety belt in event of a dangerous situation, said retractor comprising: a support assembly; a reel assembly supported by said support assembly, said safety belt being wound and unwound by said reel assembly, said reel assembly having a winding direction of rotation for retraction of said safety belt and an unwinding direction of rotation for withdrawal of said safety belt; means biasing said reel assembly in a belt retraction direction a locking mechanism supported by said support assembly, said locking mechanism having an unlocked position to allow rotation of said reel assembly in said unwinding direction and said locking mechanism having a locked position to engage said reel assembly to prevent further rotation of said reel assembly in said unwinding direction and thereby prevent further withdrawal of said safety belt in event of a dangerous situation; a movable belt-sensitive mechanism for sensing a predetermined magnitude of acceleration of said reel assembly in the withdrawal direction of said safety belt and including a flywheel having ratchet teeth; means coupling said flywheel to said reel assembly for rotation therewith; a movable vehicle-sensitive mechanism for sensing a predetermined magnitude of change in acceleration, deceleration or orientation of the vehicle; an actuating mechanism for actuating said locking mechanism, said actuating mechanism including a movable mounting means, said flywheel and said vehicle-sensitive mechanism mounted on said mounting means, means responsive to sensing of said predetermined magnitude of change in acceleration, deceleration or orientation by said vehicle-sensitive mechanism engaging a ratchet tooth of said flywheel, said flywheel upon acceleration of rotation above a predetermined magnitude or by the stopping of rotation thereof by said vehicle sensitive mechanism causing movement of said mounting means, said movement actuating said locking mechanism to said locked position.

2. The retractor according to claim 1 wherein: said reel assembly comprises a first shaft; and said mounting means comprises a plate slidably mounted on said first shaft, said flywheel mounted on said mounting plate, and a means for limiting rotation of said mounting plate.

3. The retractor according to claim 2 wherein: said support assembly comprises a base and two side walls extending from said base, said side walls being approximately parallel to one another and perpendicular to said base, said support assembly thereby having a substantial U-shape, said mounting plate being disposed parallel to a side wall of said support assembly on the outside of said support assembly; said first shaft of said reel assembly being disposed between the side walls of said support assembly, extending through and journaled on said side walls, said safety belt being wound and unwound on said first shaft, said reel biasing means connected to said first shaft and biasing said first shaft in said winding direction of rotation to wind said safety belt on said first shaft; said locking mechanism comprising: a first wheel having ratchet teeth disposed around the outer circumference of said first wheel, said first wheel being mounted on said first shaft of said reel assembly; and a locking pawl extending between and through said side walls of said support assembly, said locking pawl being pivotably mounted between said side walls of said support assembly and having pivoting movement between a normally unlocked position and a locked position in which said locking pawl engages a ratchet tooth of said first wheel to stop rotation of said reel assembly in the unwinding direction and thereby stop withdrawal of said safety belt and restrain movement of the user; said actuating mechanism further comprising a biasing means biasing said actuating mechanism to said unlocked position.

4. The retractor according to claim 3 wherein: said first shaft comprises a shaft section at one end thereof; and said mounting plate of said actuating mechanism has a first aperture and a second aperture and said shaft section of said reel assembly extends through said first aperture of said mounting plate, said mounting plate being mounted on said shaft section of said reel assembly for limited rotation on said shaft section; and wherein said actuating mechanism further comprises: a second shaft rotatably mounted in said second aperture of said mounting plate; and said flywheel mounted on said second shaft, means for synchronizing said second wheel in rotation with said first wheel, said synchronization causing said locking pawl to be moved by the actuating mechanism to the locked position of the locking pawl at a time when the movement of said locking pawl pivoting towards the first wheel will cause said locking pawl to engage the next ratchet tooth of said first wheel.

5. The retractor according to claim 4 wherein said belt-sensitive mechanism further comprises: a spur gear mounted on said shaft section of said first shaft of said reel assembly and a pinion gear mounted on said second shaft, said pinion gear engaged and driven by said spur gear; said flywheel rotating with said pinion gear on said second shaft, said flywheel resisting acceleration of rotation above a predetermined magnitude corresponding to acceleration in the withdrawal direction of said safety belt above a predetermined magnitude of acceleration and said flywheel upon acceleration of rotation above a predetermined magnitude causing said pinion gear to move with reference to said spur gear along an arc of said spur gear; said pinion gear and said second shaft mounted on said mounting plate; said movement of said pinion gear along said arc of said spur gear thereby causing rotation of said mounting plate, said rotation actuating said locking mechanism of said retractor to said locked position.

6. The retractor according to claim 4 wherein said vehicle-sensitive mechanism comprises: a pawl pivot post mounted on said mounting plate; an actuating pawl mounted on said pawl pivot post, said ratchet teeth of said flywheel engageable by said actuating pawl; and a pendulum assembly mounted on said mounting plate for moving said actuating pawl into engagement with a ratchet tooth of said flywheel.

7. The retractor according to claim 6 wherein said pendulum assembly comprises: a pendulum rod having an upper end and a lower end; a pendulum head disposed at the upper end of said pendulum rod; a pendulum weight disposed at the lower end of said pendulum rod; and a pendulum support having an aperture therein adapted to receive said pendulum rod, said pendulum support being mounted on said movable mounting plate; said pendulum rod being adapted for oscillating motion with reference to said pendulum support.

8. The retractor according to claim 3 wherein biasing means for said actuating mechanism comprises: a stop member mounted on said support assembly, said mounting plate of said actuating mechanism abutting said stop member when said actuating mechanism is in said unlocked position; a spring post mounted on said support assembly; and a biasing spring adapted to bias said mounting plate in the unlocked position, said biasing spring having two ends, one end of said biasing spring being attached to said spring post and the other end of said spring being attached to said mounting plate.

9. A retractor for use with a safety belt in a vehicle, said retractor comprising:
 a. a support assembly;
 b. a reel assembly mounted in and supported by said support assembly, means biasing said reel assembly in a belt retraction direction, said reel assembly having a winding direction of rotation for retraction of said safety belt and an unwinding direction of rotation for withdrawal of said safety belt, said reel assembly having: a first shaft;
 c. a locking mechanism mounted on and supported by said support assembly;
 d. a movable belt-sensitive mechanism for sensing a predetermined magnitude of acceleration of said safety belt in the withdrawal direction;
 e. a movable vehicle-sensitive mechanism for sensing a predetermined magnitude of change in acceleration, deceleration or orientation of the vehicle; said vehicle-sensitive mechanism including: an actuating pawl and a pendulum assembly;
 f. a movable actuating mechanism for actuating said locking mechanism; said actuating mechanism responsive to either said belt-sensitive mechanism or said vehicle-sensitive mechanism, said actuating mechanism having a locked position and an unlocked position, said locked position of said actuating mechanism moving said locking mechanism to said locked position of said locking mechanism and said unlocked position of said actuating mechanism allowing said locking mechanism to return to said unlocked position of said locking mechanism, said actuating mechanism moving between said unlocked position and said locked position of said actuating mechanism and thereby actuating said locking mechanism between said unlocked position and said locked position of said locking mechanism to prevent further withdrawal of said safety belt in event of a dangerous situation; said actuating mechanism comprising: a movable mounting plate slidably mounted on said first shaft, said movable mounting plate rotatable with reference to said first shaft in response to said belt-sensitive mechanism, said belt-sensitive mechanism and said vehicle-sensitive mechanism being mounted on said mounting plate and movable with said mounting plate, said belt-sensitive mechanism including an inertial flywheel mounted on said mounting plate, means coupling said flywheel for rotation with said reel assembly, said flywheel resisting acceleration of rotation above a predetermined magnitude corresponding to acceleration of said reel assembly in the withdrawal direction of said safety belt above a predetermined magnitude of acceleration and said flywheel upon acceleration of rotation above a predetermined magnitude or by the stopping of rotation thereof by said vehicle sensitive mechanism causing limited rotation of said mounting plate, said limited rotation actuating said locking mechanism of said retractor to said locked position, said flywheel having ratchet teeth on the circumference thereof engaged by said actuating pawl of said vehicle-sensitive mechanism, said pendulum assembly of said vehicle-sensitive mechanism moving said actuating pawl into engagement with a ratchet tooth of said flywheel, and a biasing means biasing said actuating mechanism to said unlocked position.

10. In a retractor adapted for use with a safety belt in a vehicle to prevent further withdrawal of said safety belt by a locking action on said safety belt in event of a dangerous situation, the retractor comprising: a reel assembly for winding and unwinding said safety belt; means biasing said reel assembly in a belt retraction direction, a locking mechanism having an unlocked position to allow withdrawal of said safety belt from said retractor and a locked position to prevent further withdrawal of said safety belt in event of a dangerous situation; a belt-sensitive mechanism sensing a predetermined magnitude of acceleration of said reel assembly in the safety belt withdrawal direction; a vehicle-sensitive mechanism sensing a predetermined magnitude of change in acceleration, deceleration or orientation of the vehicle; and an actuating mechanism for actuating said locking mechanism to said locked position in response to said belt-sensitive mechanism or said vehicle-sensitive mechanism; the improvement wherein said actuating mechanism comprises: a rotatable mounting plate, said belt sensitive mechanism including a combined ratchet and flywheel rotatably mounted on said mounting plate, means coupling said flywheel for rotation with said reel assembly, said flywheel upon acceleration of rotation above a predetermined magnitude or by stopping of rotation thereof by said vehicle sensitive mechanism causing rotation of said mounting plate, said rotation actuating said locking mechanism to said locked position means responsive to sensing of said predetermined magnitude of change in acceleration, deceleration or orientation by said vehicle-sensitive mechanism for engaging said ratchet of said flywheel, said vehicle-sensitive mechanism being mounted on said mounting plate.

* * * * *